(12) United States Patent
Marshall et al.

(10) Patent No.: US 11,217,126 B2
(45) Date of Patent: Jan. 4, 2022

(54) SYSTEMS, METHODS AND APPARATUS FOR SELF-COORDINATED DRONE BASED DIGITAL SIGNAGE

(71) Applicant: Intel Corporation, Santa Clara, CA (US)

(72) Inventors: Carl S. Marshall, Portland, OR (US); John Sherry, Portland, OR (US); Giuseppe Raffa, Portland, OR (US); Glen J. Anderson, Beaverton, OR (US); Selvakumar Panneer, Portland, OR (US); Daniel Pohl, Puchheim (DE)

(73) Assignee: INTEL CORPORATION, Santa Clara, CA (US)

( * ) Notice: Subject to any disclaimer, the term of this patent is extended or adjusted under 35 U.S.C. 154(b) by 201 days.

(21) Appl. No.: 15/857,550

(22) Filed: Dec. 28, 2017

(65) Prior Publication Data
US 2019/0051224 A1 Feb. 14, 2019

(51) Int. Cl.
| | | |
|---|---|---|
| *G09F 19/18* | (2006.01) | |
| *G03B 29/00* | (2021.01) | |
| *B64C 39/02* | (2006.01) | |
| *G05D 1/00* | (2006.01) | |
| *G05D 1/10* | (2006.01) | |
| *G09F 21/06* | (2006.01) | |

(Continued)

(52) U.S. Cl.
CPC ............ *G09F 19/18* (2013.01); *B64C 39/024* (2013.01); *G03B 21/145* (2013.01); *G03B 29/00* (2013.01); *G05D 1/0094* (2013.01); *G05D 1/104* (2013.01); *G09F 19/226* (2013.01); *G09F 21/06* (2013.01); *B64C 2201/123* (2013.01)

(58) Field of Classification Search
CPC ........ G09F 21/06; G09F 19/226; G09F 19/18; G05D 1/104; G05D 1/0094; G03B 29/00; G03B 21/145; B64C 39/04; B64C 2201/123
See application file for complete search history.

(56) References Cited

U.S. PATENT DOCUMENTS 5,992,065 A * 11/1999 Preiser .................... G09F 21/16
40/212
8,091,822 B2 * 1/2012 Boyce .................... G09G 3/001
244/13

(Continued)

OTHER PUBLICATIONS https://www.wired.com/2016/08/chopper-just-projected-video-onto-giant-screen-towed-another-chopper/—2016.*

(Continued)

*Primary Examiner* — Nicholas Kiswanto
(74) *Attorney, Agent, or Firm* — Spectrum IP Law Group LLC

(57) ABSTRACT

The disclosed embodiments generally relate to methods, systems and apparatuses to provide ad hoc digital signage for public or private display. In certain embodiments, the disclosure provides dynamically formed digital signage. In one application, one or more drones are used to project the desired signage. In another application one or more drones are used to form a background to receive the projected image. In still another application, sensors are used to detect audience movement, line of sight or engagement level. The sensor information is then used to arrange the projecting drones or the surface-image drones to further signage presentation.

18 Claims, 8 Drawing Sheets

(51) Int. Cl.
  *G09F 19/22* (2006.01)
  *G03B 21/14* (2006.01)

(56) References Cited

U.S. PATENT DOCUMENTS

| | | | | | |
|---|---|---|---|---|---|
| 8,876,295 | B2* | 11/2014 | Scanlon | ............... | G03B 21/562 |
| | | | | | 345/204 |
| 9,984,389 | B2* | 5/2018 | Nozawa | ............. | G06Q 30/0261 |
| 10,109,224 | B1* | 10/2018 | Ratti | ..................... | B64C 39/024 |
| 2005/0259150 | A1* | 11/2005 | Furumi | ................... | G09F 21/06 |
| | | | | | 348/144 |
| 2012/0327378 | A1* | 12/2012 | Harvey | ................ | G03B 21/145 |
| | | | | | 353/52 |
| 2014/0236388 | A1* | 8/2014 | Wong | ....................... | G09G 5/02 |
| | | | | | 701/2 |
| 2015/0183526 | A1* | 7/2015 | Hayashi | .................. | F21S 43/14 |
| | | | | | 362/470 |
| 2016/0041628 | A1* | 2/2016 | Verma | .................... | G06F 3/017 |
| | | | | | 345/156 |
| 2016/0284256 | A1* | 9/2016 | Wigell | .................. | B64D 47/02 |
| 2016/0349746 | A1* | 12/2016 | Grau | .................... | G05D 1/0094 |
| 2017/0240296 | A1* | 8/2017 | Molnar | .................... | G09F 19/18 |
| 2018/0047319 | A1* | 2/2018 | Barba | .................... | G03B 29/00 |
| 2018/0095607 | A1* | 4/2018 | Proctor | .................... | G06F 3/011 |
| 2018/0174448 | A1* | 6/2018 | Gomez Gutierrez | .... | G08G 1/08 |
| 2018/0229828 | A1* | 8/2018 | Yang | ..................... | G03B 29/00 |
| 2018/0253606 | A1* | 9/2018 | Dhua | ................... | G05D 1/0094 |
| 2018/0342184 | A1* | 11/2018 | Magovern, III | ........ | G09F 21/12 |
| 2019/0051194 | A1* | 2/2019 | Campos Macias | .. | G06K 7/1417 |
| 2019/0052852 | A1* | 2/2019 | Schick | .................... | G06T 7/521 |

OTHER PUBLICATIONS https://www.koeppeldirect.com/business/whats-latest-drone-advertising/—2016.* https://web.archive.org/web/20140714003142/https://www.fox5vegas.com/story/25993064/teen-entrepreneurs-drone-advertising-business-taking-off/—2014.* https://www.youtube.com/watch?v=7bGA_VHc73o—Helicopter projection [Aug. 26, 2016].*

* cited by examiner

SYSTEMS, METHODS AND APPARATUS FOR SELF-COORDINATED DRONE BASED DIGITAL SIGNAGE

FIELD

The present disclosure generally relates to systems, methods and apparatus for self-coordinated drone based digital signage. Specifically, certain embodiments of the disclosure relate to method and system for ad hoc formation of digital signs directed to an audience.

BACKGROUND

Today's digital signage is locally fixed in the environment (e.g., billboards along highway, signs on downtown streets, etc.). The signs may be digital in that they can change the types of ads being displayed but they are still fixed at a designated location. Such signs are not mobile and not easily transportable. Conventional mobile projection systems project an image on substantially stationary surfaces. For example, during the 2017 Super Bowl, drones aligned formed an ad in the sky by aligning next to each other to spell the word "Intel" by incorporating a light source on the drone itself.

Conventional applications do not provide mobility for digital signs. The conventional ad displays with drones do not re-configure automatically in response to location change or audience change. Further, the conventional drones do not project a display ad onto a surface.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
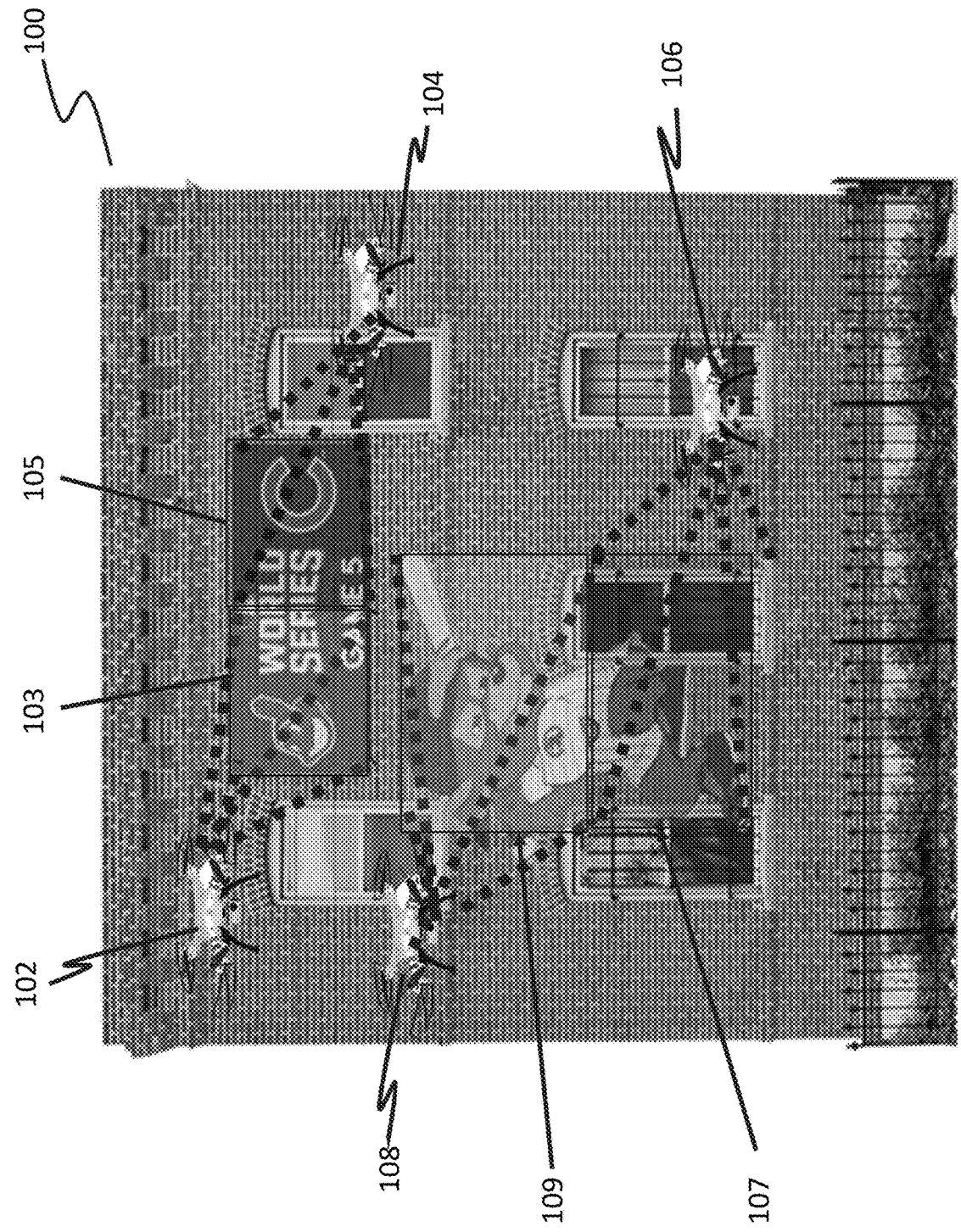
FIG. 1 schematically illustrates an exemplary dynamic projection according to one embodiment of the disclosure.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As stated, conventional signs are fixed to a location such as a billboard. The signs may be digital in that they can change the type of ads being displayed but signs are nonetheless fixed at location. The media that the drone(s) project can be images, video, and/or audio. The display content may be adjusted based on aggregated needs, context and profile of the audience. If in a scenario where people are walking, then the content can be more detailed. If projection is along highway where cars are zooming by, then the system may make the projection size larger and with less details.

In certain embodiments, the disclosure dynamically creates digital signage anywhere within the environment on any arbitrary surface. In another embodiment, the disclosure relates to a plurality of self-coordinated drones to project a digital signage that can be re-adjusted (i.e., in positional and angular directions) to several locations to optimize visibility to a maximum audience. A first plurality of drones may be used to form a projection surface (or a backdrop) to receive a digital signage. One or more projector drones may be used to project onto the projection surface to display a desired signage. An exemplary projector (or projection) drone may comprise optical train and electronics necessary to project an image from the drone to a surface. A projecting drone may store the image(s) or it may wirelessly receive the images. The projector drone(s) and the plurality of surface-forming drones may move or change presentation angle to remain well within the audiences' line of sight. The drones may also output 3D audio sound by spatially positioning around an audience and emit the sound to produce 3D sounds. In one embodiment, the drones may project a directional symbol like an arrow to draw attention to something of interest such as a building or billboard.

Where a group of drones are used to display a signage, one of the drone can take the role of quality assessment. It can take pictures/video from the audience level and determine if the sign is oriented properly, is bright enough and is gathering sufficient interest. A drone may analyze the audience's interest level and adjust content accordingly. The drones may also continuously analyze the audience (e.g., gender, age or other features.) and tailor content accordingly.

In one embodiment, the signage is created ad hoc and based on potential audience's movement pattern. In another embodiment, the ad hoc surface is created and located to be in direct line of sight of a potential audience. In still another embodiment, the surface is configured to move or change direction as the audience moves or changes its line of sight. In yet another embodiment, the disclosure relates to amplifying projection of a visual ad using multiple projector drones. In still another embodiment, the digital signage is optically adjusted to compensate for ambient light or lack of light. In another embodiment, the ad content may be changed based on the audience's detected mood or expression. In another embodiment, one or more drones may be used to amplify a structural defect display to an audience.

FIG. 1 schematically illustrates an exemplary dynamic projection according to one embodiment of the disclosure. In FIG. 1, drones 102, 104, 106 and 108 are arranged around building 100. Portions of building 100 is used by drones 102, 104, 106 and 108 as a backdrop or projection screen. Each of Drone 102, 104, 106 and 108 may be configured to be self-guided and position itself with respect to building 100 and the other drones to project the desired signage. Here, the drones are moved, tilted or otherwise positioned so as to stitch different portions of the signage so as to form a uniform (seamless) signage to the audience. In certain embodiments, each of drones 102 and 104 may positioned similarly with respect to building 100 to provide a substantially uniform digital signage display. In another embodiment (as shown) drones 102 and 104 my be positioned differently (non-uniformly) with respect to building 100 to provide a substantially uniform digital signage display. In still another embodiment, it may be desired to provide a non-uniform display such that a portion of the displayed image appears elongated as compared with the first portion. Each of the multiple drones may then be positioned to provide the desired abnormality. As described below, each drone may include one or more processing circuitries and memory circuitries to enable flight pattern and positioning of the drone to project the desired signage.

In the exemplary embodiment of FIG. 1 each of drones 102, 104, 106 and 108 is configured to project. Drone 102, for example, projects portion 103 of the top image. Drone 104 projects portion 105 of the top image. Drone 106 projects portion 107 of the bottom image. Drone 108 projects portion 109 of the top image. In certain embodiments, placement of each of drones 102, 104, 106 and 108 is organized to provide an image that is optimally visible. To this end, each drone may further comprise one or more sensors (e.g., optical sensors, character recognition sensors), accelerometer or gyroscope to aid the drone into finding an optimal position to display the signage. Moreover, each drone may include sensors to detect ambient light and compensate the projected image for optimal visibility.

In the exemplary embodiment of FIG. 1, drones 102, 104, 106 and 108 may scan building 100 to identify one or more portions of building to display images 103, 105, 106 and 107. The scanning may define geospatial scanning so as to identify location which will be most likely viewed by an audience, such as passer byes. For example, drones 102, 104, 106 and 108 may scout for locations outside of a baseball stadium and identify building 100 in the stadium exit path such that the patrons may have a clear line of sight (LOS) to the displayed images upon exiting the venue. As stated, one or more drone may reposition itself by changing location or projection angle to thereby readjust the image. Image readjustment may be done to accommodate the audience's LOS or changing environmental factors.

As stated, one or more drones may form a screen or backdrop to receive projected images from image projecting drones. In one embodiment of the disclosure, these so-called screen-forming drones may coordinate themselves to create a large screen. The screen may include a rolled up projective film that unrolls to a full screen. In certain embodiments, the screen may be a netted screen that is formed on demand. Such screens may be formed ad hoc in an open space so that projecting drones can collaborate and project content thereon. The screen-forming drones, similar to the projecting drones, may be configured to automatically organize themselves (position, orientation, number of drones) to form the surface with the needed quality for the visual signage and to keep the signage stable (i.e., despite adverse weather or environmental conditions).

Both projection and screen-forming drones may also comprise circuitry and be configured to self-adjust to a changing audience. The change may be directed to geo-location or it may be content related change. For example, the drones may identify a projection surface in LOS of a crowd and start projecting digital content on that surface. The drones may also auto-adjust position, lumens (dimming), and projection angles to get the appropriate projection on the surface so that the signage is optimally visible to the crowd.

The drones may be configured to reorganize and continue to display on various other surfaces as the audience moves or as the traffic pattern of audience changes. In still other embodiments, the drones may consider the crowd's aggregated context and profile in order to determine the digital signage to be displayed (i.e., what product or service that can be of interest of the majority of people) and how (i.e., business or consumer focus, specific events, etc.) To this end, the drones include one or more sensors to detect environmental patterns, movement patters or other factors.

In certain embodiments, the drones may be part of an Internet of Things (IoT) network. In this manner, the drones may receive information from other devices in the IoT network that provides pertinent information. An IoT device may include wearable wireless devices. Wearable devices can complement the system by monitoring each user's response and attention to the signage. Mobile devices may contain profile and preference information that can be leveraged to determine what content to display. Wearable or mobile devices can complement the system by providing the user with an easy to use method to capture the signage for future consumption, for example, by pointing the device in the direction of the signage. In this manner, the system can keep track of prior interactions with the digital signage to create and update each user profile and preferences.

For example, the drones may receive information that indicates audience's level of engagement or level of excitement. In another example, the drones may receive information about a recent event (e.g., final score for a sporting event) and form a signage appropriate to the event. The drones themselves may include one or more sensor and circuitry (including hardware and software) to detect facial expression or other human indicia. This information can be used to further tailor and display appropriate signage.

Figure 2A:
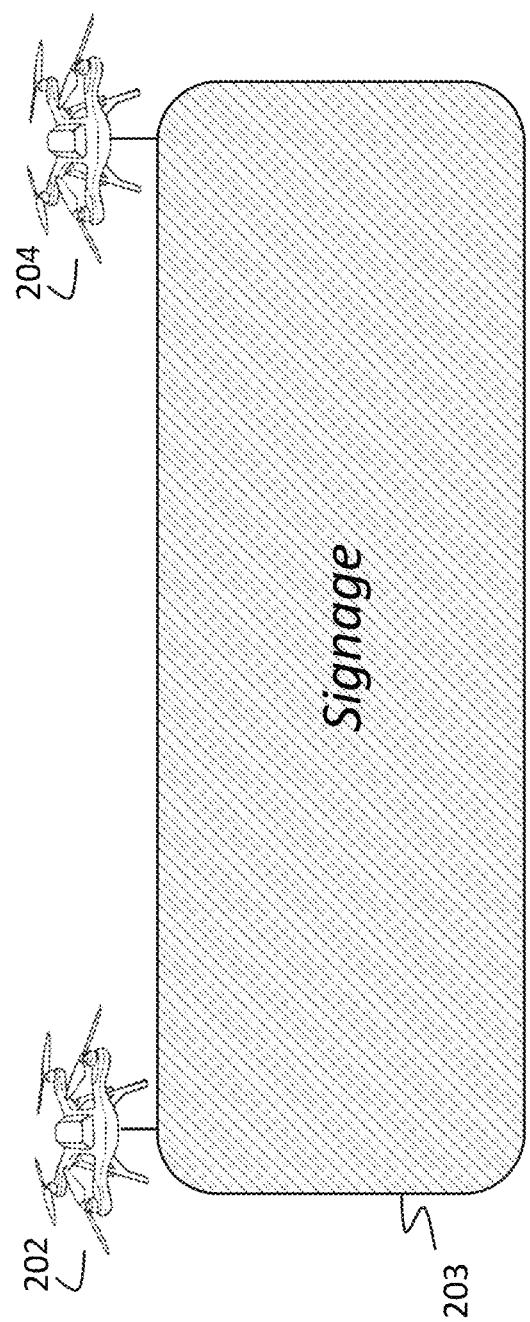
FIG. 2A schematically illustrates an embodiment of the disclosure with screen-forming drones supporting a drop-down screen.
Figure 2B:
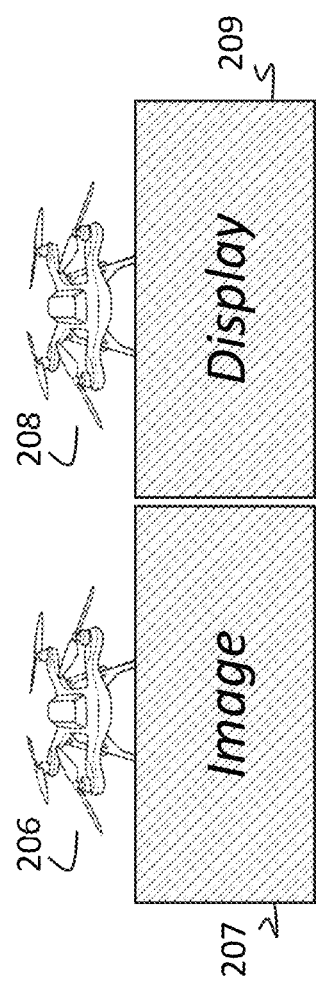
FIG. 2B schematically illustrates another embodiment of the disclosure where a plurality of screen-forming drones aligns to form a tile display

In certain embodiments, a swarm of drones may be divided in two groups. One group of drones may project the signage and the other group of drones may hold a section of the surface to receive the image. This method eliminates the need for finding a projectable surface. FIGS. 2A and 2B illustrate the group of drones presenting a surface to receive the image.

FIG. 2A schematically illustrates an embodiment of the disclosure with screen-forming drones supporting a drop-down screen. In FIG. 2, drones 202 and 204 may be coupled to screen 203. Screen 203 may be used to display a signage. Screen 203 may be roll-down screen and drones 202 and 203 my control the screens roll down and roll up. Screen 203 may also be a digital screen configured to display messages. For example, screen 203 may comprise a light-emitting diode (LED) or organic LED display with circuitry and software to display signage. Drones 202 and 204 may position themselves at a desired location to allow screen 203 to be well within an audience's LOS.

FIG. 2B schematically illustrates another embodiment of the disclosure where a plurality of screen-forming drones aligns to form a tile display. Here, each drone owns segment of the display (e.g., a tile) and autonomously aligns and stitches screen together. Here the tiles are positioned next to each other such that the complete image appears stitched together and seamless. The screen could be transparent projective screens, netted mesh with high reflective material etc. The number of drones can be increased to increase lumens (align projected segments), compensate for the color and reflection of the surface. In FIG. 2B, drones 206 and 208 self-align to place screens (interchangeably, tiles) 207 and 209 adjacent each other. The drones may be further configured to maintain appropriate flight position, speed or other necessary flight attributes to maintain screens 207, 209 in proper formation. Screens 207, 209 may be rigidly or flexibly coupled to drones 206, 208, respectively. Screens 207, 209 may also be coupled to drones 206, 208 to allow rotation, extension or tilting in relation to the drone. In one embodiment, drones 206 and 208 may be substantially stationary. In another embodiment, drones 206 and 208 may be moving along a desired flight path with screens 207, 208 in tow. Screens 207, 208 may comprise roll-down screens or may comprise a planar substrate suitable for image projection. Further, each screen may be configured to receive optical projection, or it may be configured with electronic circuitry and logic to self-display (e.g., LED, OLED, QLED or QD). Drones 206 and 208 may further be configured to reposition themselves and/or screens 207, 209 for better audience viewing.

Figure 3:
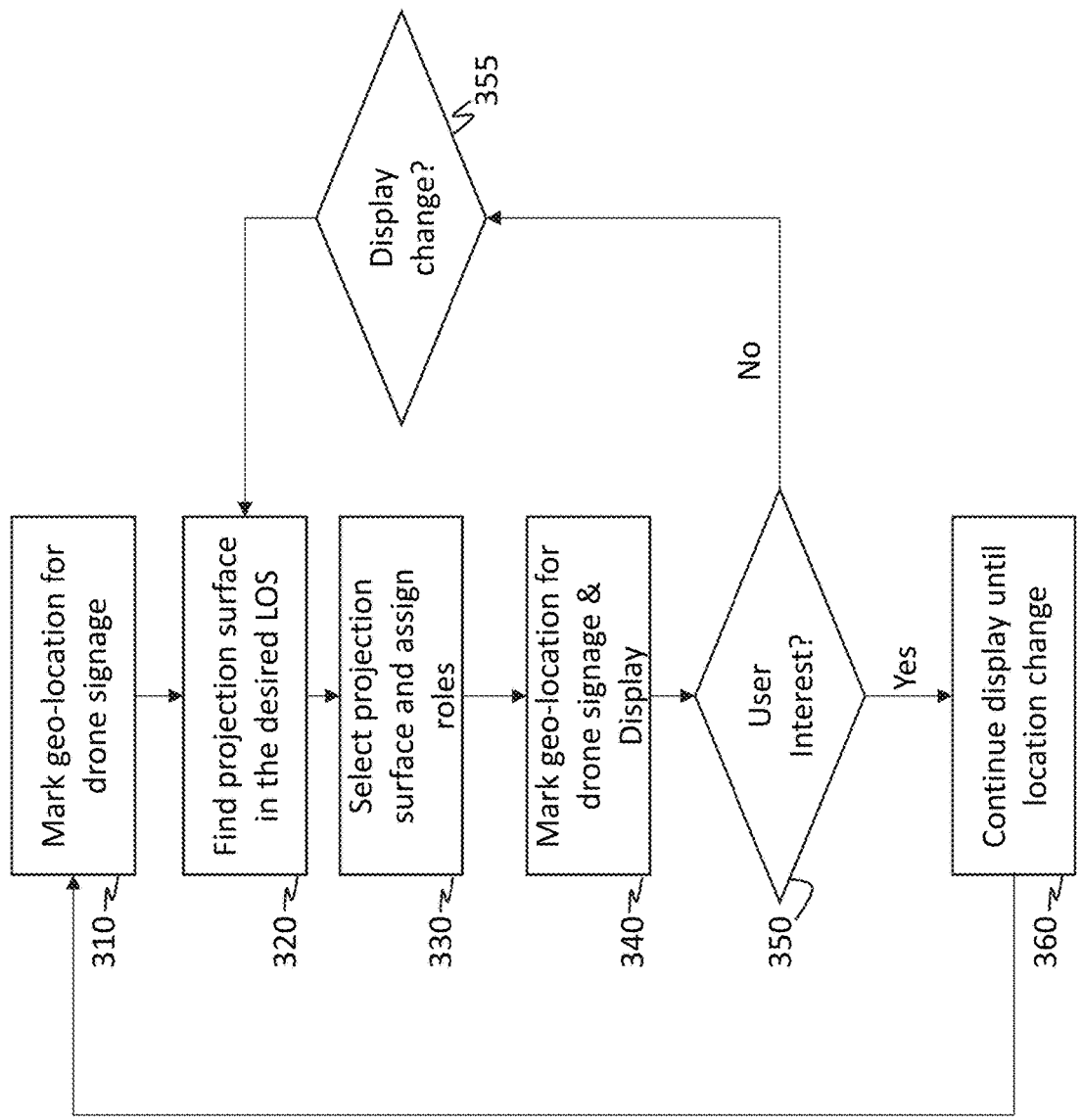
FIG. 3 shows an exemplary flow diagram for implementing an embodiment of the disclosure.

FIG. 3 shows an exemplary flow diagram for implementing an embodiment of the disclosure. The process of FIG. 3 starts at step 310 where an initial geographic location (geo-location) is identified and the drone, or the drone, swarm is directed to the identified location. Step 310 may be directed by an external source. For example, a server may identify a gathering crowd at a location and direct the drones to that location. By way of another example, a server may identify regularly occurring traffic pattern at a location that provides captured audience and direct a drone or the drone swarm to that location.

At step 320, one or more drone locates people/crowds that would view the signage and finds a projection surface in the crowd's LOS. In certain embodiments, step 320 may be subsumed in step 310. That is, a projection surface may be identified along with the location identification. If a projection surface is not readily available, screen-forming drones can be directed to the sight to assist in signage display. If projection surface is not already identified at the prior steps, at step 330, the drones may select the projection surface and/or assign roles to the screen-forming drones.

At step 340, the signage is displayed by one or more drones. The drones may also output 3D audio sound by spatially positioning around an audience and emit the sound to produce 3D sounds. As discussed above, audiences' interest may be gauged from one or more sensors that may be co-located with the drones or they interest may be gauged using external sensors and devices such as IoT.

At step 350 a decision is made as to whether the audiences' interest exceeds a desired threshold. If the audiences' engagement does not equal or exceed the threshold, the display content may be changed as shown in step 355. If the audiences' interest is met, the flow diagram proceeds to step 360 where the signage display is continued until location changes. Once the location is changed, the process is repeated at step 310.

Throughout the display process, the drones may self-adjust or rearrange to provide clear LOS and to accommodate environmental changes. For example, a master drone may dictate position changes, tilt angle or other flight requirements to slave drones to maintain a clear LOS to the audience.

In certain embodiments, drones will avoid direct occlusion of the projected display by understanding the viewing angle of the audience and move accordingly. Auto-Keystone correction techniques may be applied if the drones are at non-orthogonal angles. The Auto-Keystone correction techniques are known in the art and involve changing the output image so that it would appear with the correct form factor from the audience point of view.

In other example, projection lumen or optical zoom may be adjusted to increase or decrease size and visibility.

The flow diagram of FIG. 3 may be implemented by a central controller (including hardware circuitry, software and firmware) in communication with one or more drones. The controller may be external to the drones (e.g., cloud). In one embodiment, the controller (and control responsibility) may be assumed by a master drones and dictated to slave drones. In another embodiment, the steps of the flow diagram may be distributed among the drones and each drone may assume responsibility for a portion of the flow diagram.

Figure 4:
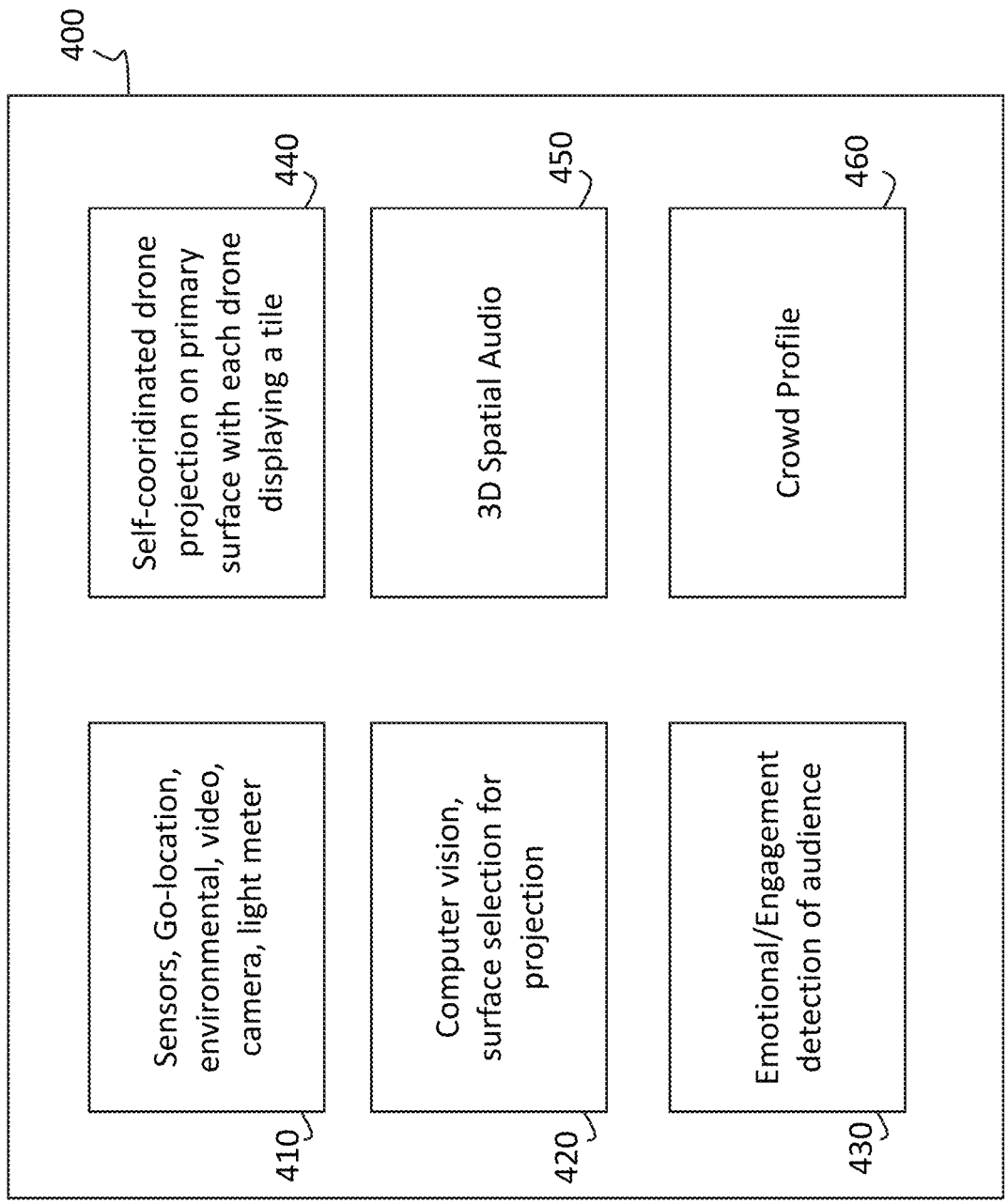
FIG. 4 is a system diagram according to one embodiment of the disclosure.

FIG. 4 is a system diagram according to one embodiment of the disclosure. The system of FIG. 4 may be implemented on hardware (including circuitry), software or a combination of hardware and software. Exemplary modules disclosed in FIG. 4 may be implemented at one or more processors. In certain embodiments, system 400 may be implemented at a centralized location, for example, on a drone or on a cloud computing system. In another embodiment, system 400 may be implemented in a distributed manner. For example, one or more exemplary modules of FIG. 4 may be implemented at more than one location. While system 400 is shown with six exemplary modules, it should be noted that the disclosed principles are not limited to six and more or less modules may be used without departing from the disclosed embodiments.

Module 410 of FIG. 4 includes sensors, geolocation devices (e.g., GPS), environmental sensors (e.g., light detection sensors), video display device (e.g., projectors and other optical trains for projecting an image), camera (e.g., recording camera) and light emitter devices. An exemplary drone may be equipped with geo-location, environmental (wind direction/speed, temp, etc.), video camera for understanding geometry of the environment, and a light meter for understanding how many lumens are needed to project on various surfaces, Distance sensors to measure the distance between the surface and the drone as well as distance between the projected surface and the spectators may also be included.

Module 420 may include computer vision to identify and select suitable surfaces to project an image. Thus, an exemplary drone may seek to find an appropriate projection surface in the crowd's vicinity. An optimal surface may be a planar surface and have a lighter material property or it could be any arbitrary objects like tree, buildings or dense clouds to receive a project image.

An optional module (or an add-on functionality) may be included to provide a language dictionary to allow real time translation of content.

Module 430 may include sensors and devices for emotion/engagement detection of Audience. Such modules can monitor crowds and detect if the user(s) are looking at the digital signage and also if the user(s) are smiling, are passive, etc. wearable or mobile technologies (e.g., IoT) can be leveraged for emotion response detection. An optional module (or an add-on functionality) may be included to provide context detection. Here, the system may monitor the crowd's contextual elements, such as position, location of people in a crowd, interests and current conversations (if users have opted-in), time availability etc. An optional module (or an add-on functionality) may be included to keep track of previous interaction of each person with a digital signage and effectiveness of the content (history module).

Module 440 may provide drone projection display. Each drone may have a projector and the of drones group may auto-align tiles of the projection display. The projectors may be a focus-free laser projector or standard projectors where the system can use camera feed of the projected content to auto focus the projector. The feed content may be stored on the drone(s) hardware or it may be transmitted to the drone(s) for projection. In one embodiment, each drone may display a tile that may combine with other tiles to form a mosaic display.

In one embodiment, projection screens may be attached to certain drones to create a large screen so other drones can project thereon. Multiple drones may coordinate to create a screen that is directly in line of slight with the spectators. The screen may be transparent projective screens, netted mesh with high reflective material or any other form suitable for receiving an image.

Module 450 is 3D spatial audio module. Module 450 may be optionally used if the intended signage is to include audio component. The drones may output audio from the digital signage and this could be done with spatial audio since drones may fly in a 360 formation.

Module 460 may be configured to determine audience or crowd Profile. Here, the module may store crowd profiles (e.g., age, gender, crowd size, etc.) based on current or past events or occurrences. This information may be used for targeted displays and advertisement selection.

An optional module (or an add-on functionality) may be included to provide a content provisioning system. In a content provisioning system, the content creator may upload content to be displayed and define rules to match the audience's needs and interests. For example, the rule may dictate display of a particular signage only if at least 60% of users are wearing prescription glasses. Other exemplary rules may dictate not to display the same ad more than once daily.

Figure 5:
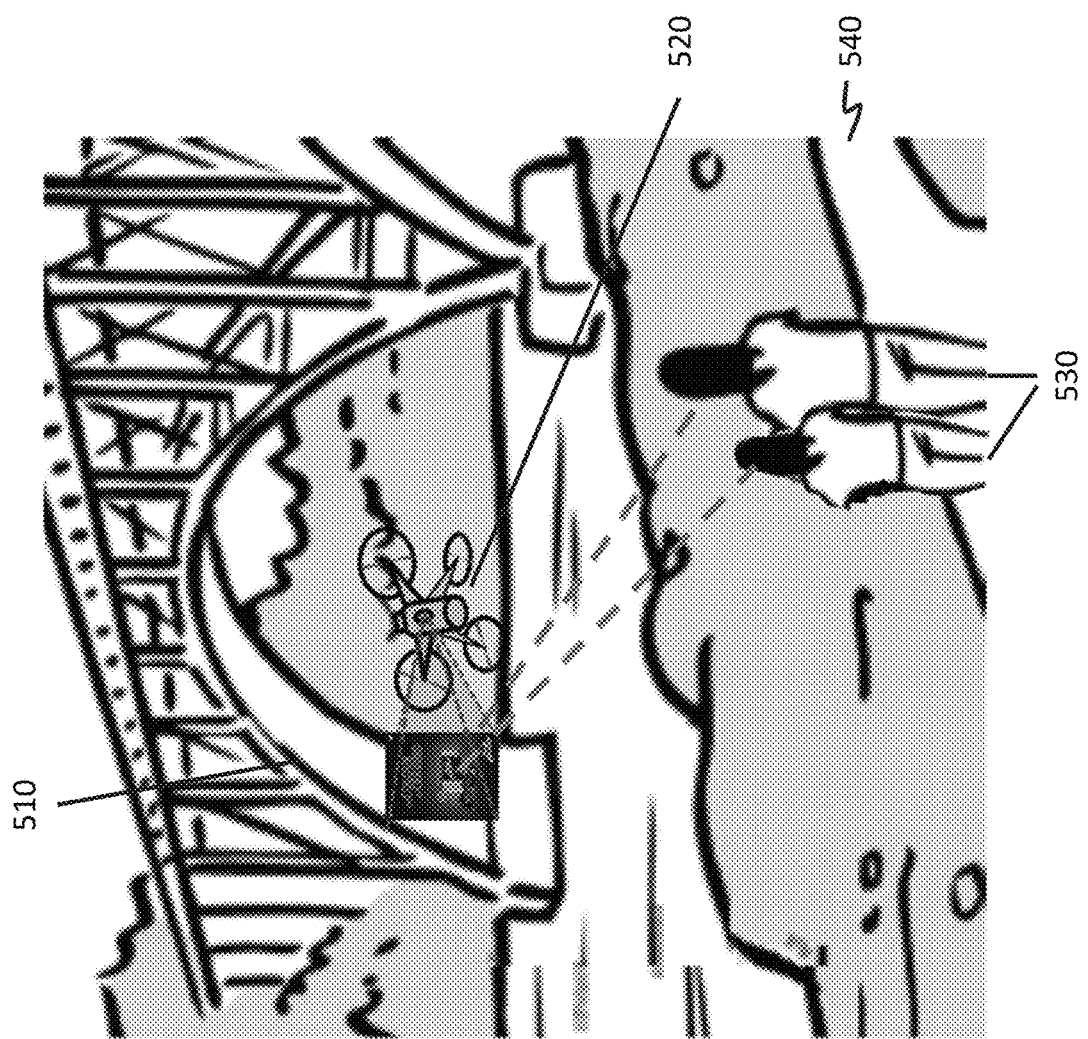
FIG. 5 shows a drone projection system according to one embodiment of the disclosure.

FIG. 5 shows a drone projection system according to one embodiment of the disclosure. In FIG. 5, drone 520 is projecting an ad on bridge post 510. Drone 520 may select bridge post 510 due to its strategic location proximal walk path 540 and the ad's visibility to audience 530. In one embodiment, drone 520 may adjust its position relative to bridge post 210 so that the ad is visible from audience 530 located further away. To this end, drone 520 may use one or more optical train to size the ad or it may move closer or further away from bridge post 510. In an exemplary embodiment, a second drone (not shown) may proximate the audience's location and direct positioning of drone 520. In another embodiment, drone 520 may change its projection angle to accommodate visibility to audience 530.

Figure 6:
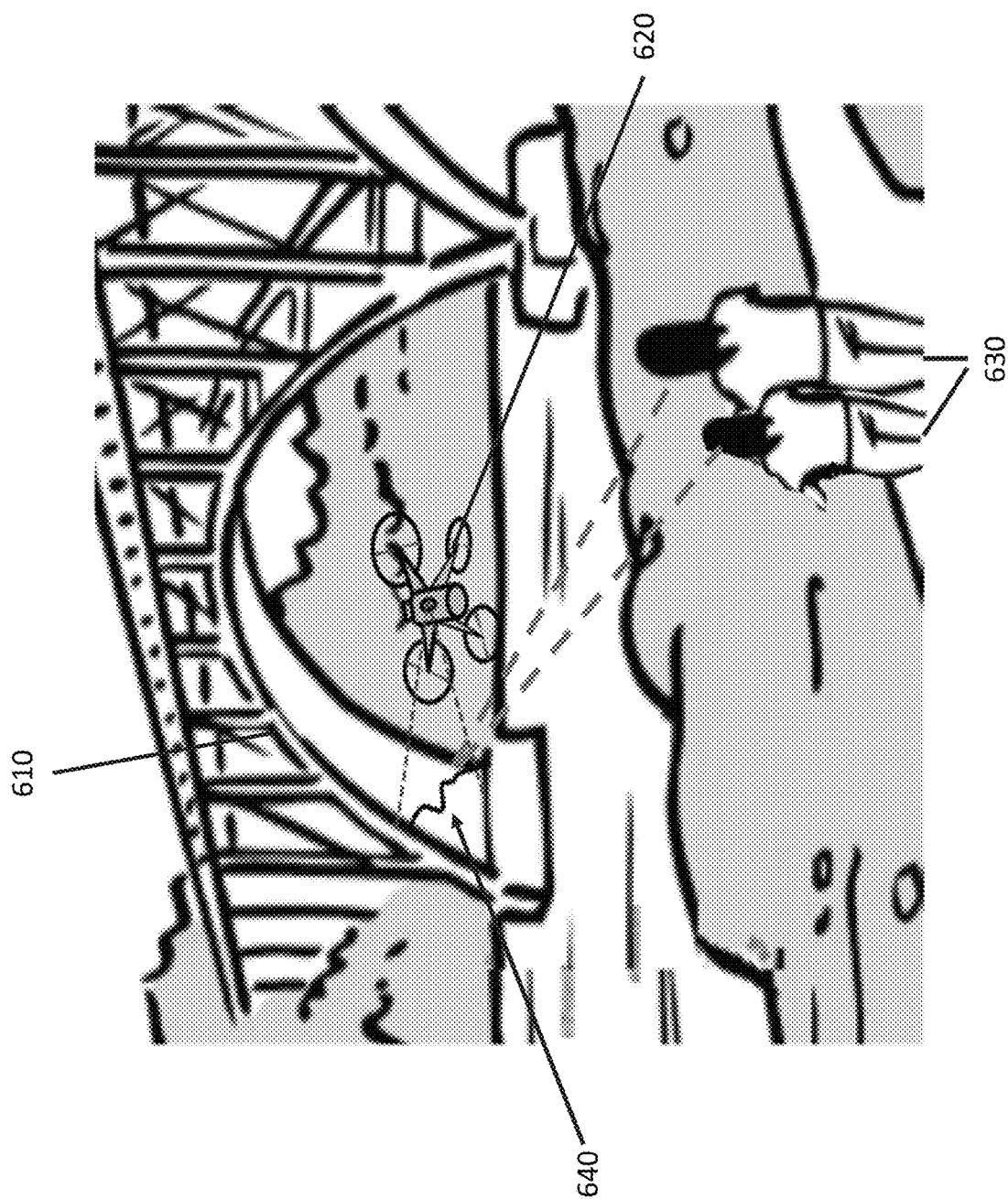
FIG. 6 shows an exemplary embodiment in which drone projection is used to magnify a structural defect according to one embodiment of the disclosure.

FIG. 6 shows an exemplary embodiment in which drone projection is used to magnify a structural defect according to one embodiment of the disclosure. Specifically, the disclosed embodiment shows an exemplary embodiment in which one or more drone is used to survey an area or a defect. In FIG. 6, bridge post 630 includes a crack which may not be readily visible from vantage point of audience 530. Here, drone 620 is used to project an augmented display of the bridge crack. In one application of this embodiment, the content (i.e., image of the defect) may be projected at a desired location after an initial image of the defect is obtained. The system may communicate with audience 630 to position themselves appropriately to view the defect as it appears (in smaller size) on the bridge.

Figure 7:
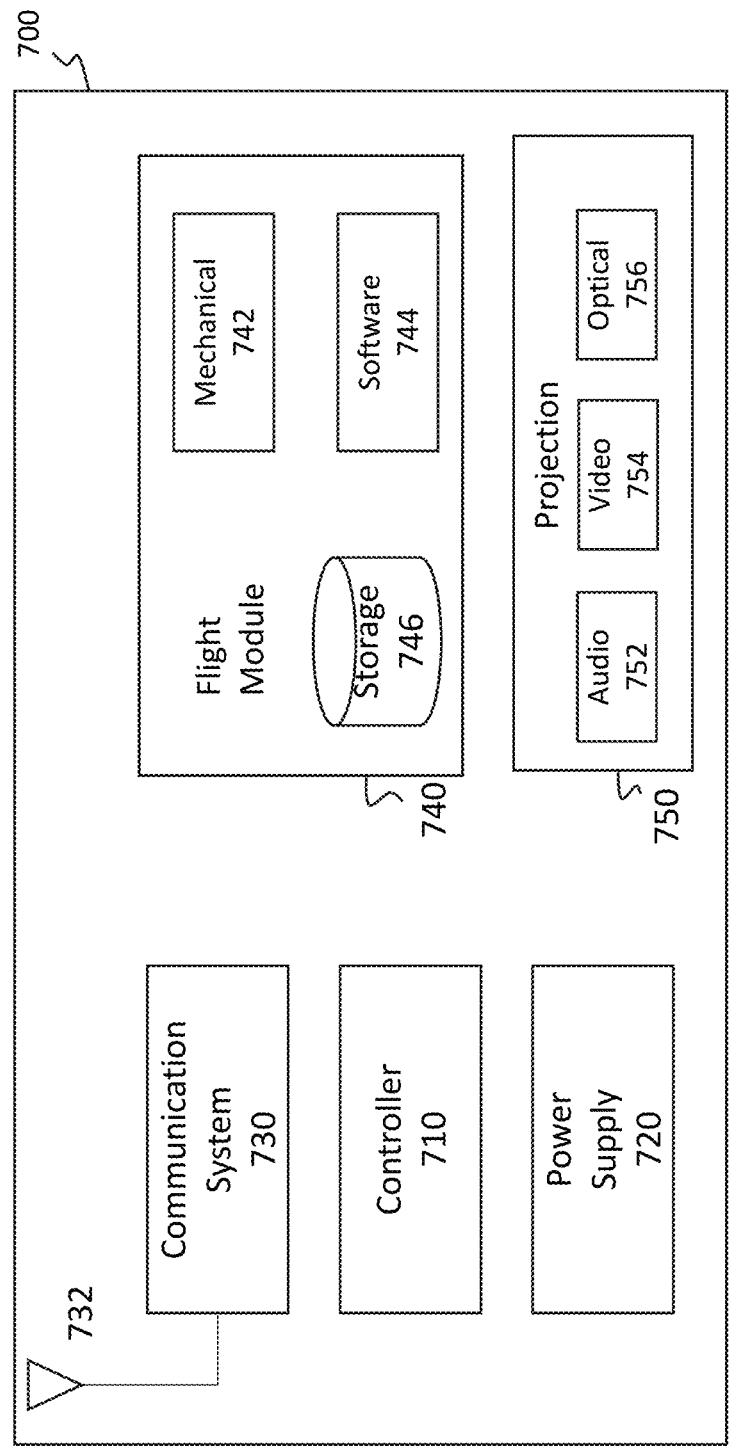
FIG. 7 shows a drone system according to one embodiment of the disclosure.

FIG. 7 shows a drone system according to one embodiment of the disclosure. Drone 700 is exemplary and non-limiting. Drone 700 includes controller 710. Controller 710 may comprise system, hardware and software required to operate the drone. In one embodiment, controller 710 may comprise one or more processing circuits (including integrated circuits) to arrange and coordinate flight, communication and other drone functions. For example, controller 710 may communicate with power supply 720 to control power supplied for mechanical functions of drone 700. Power supply 720 may comprise batteries, capacitors other conventional power storage components.

Communication system 730 may comprise hardware, software and a combination of hardware and software needed to communicate with the drone. In an exemplary embodiment, communication system 720 defines a wireless communication system compatible with any of the IEEE communication standards including cellular, WiFi, Bluetooth (BT), Bluetooth Low Energy (BLE) and Near-Field Communication (NFC). Wireless communication system 730 is shown with one or more antennas 732.

Flight module 740 addresses the drone flight operations. Flight module 740 is shown with mechanical components such as motors, propellers and other mechanical parts connecting them. The flight module also includes software required for operation of drone 700 and memory (storage) 746 for storing instructions which may include software or signage display requirements. While memory 746 is shown as part of the flight module, the disclosed embodiments are not limited thereto and memory 746 may be one or more stand-alone memory systems for servicing all of drone 700 functionalities.

Projection module 750 is shown with audio component 752, video component 754 and optical component 756. Each component may coordinate with other components to display an ad or a signage an audience according to the disclosed embodiments. Audio component 752, for example, may include radio and speaker components to play back audio portions. Video component 754 may project images directly or may communicate stored video signals to optical train 756 for projection. Optical train 756 may comprise one or more lenses and optical filters to project an image from drone 700.

While not shown, drone 700 may also include components for attaching a display tile or for carrying a roll-down display screen.

Figure 8:
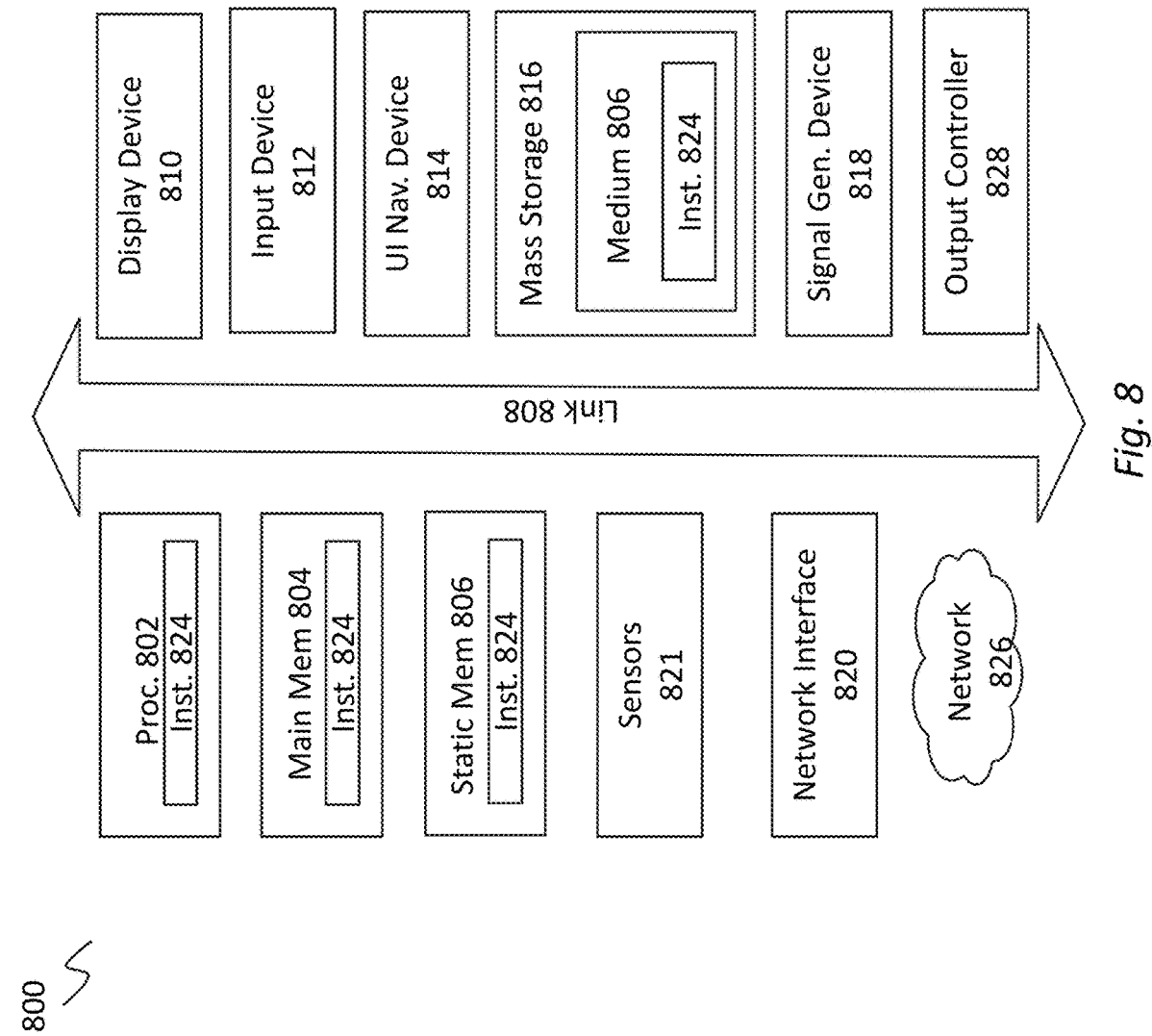
FIG. 8 illustrates generally an example of a block diagram of a machine upon which any one or more of the techniques in accordance with some embodiments.

FIG. 8 illustrates generally an example of a block diagram of a machine upon which any one or more of the techniques (e.g., methodologies) discussed herein may perform in accordance with some embodiments. In FIG. 8 the machine 800 may operate as a standalone device or may be connected (e.g., networked) to other machines. In a networked deployment, the machine 800 may operate in the capacity of a server machine, a client machine, or both in server-client network environments. In an example, machine 800 may act as a peer machine in peer-to-peer (P2P) (or other distributed) network environment. The machine 800 may be a personal computer (PC), a tablet PC, a drone computing device, a control system, an IMU, a mobile telephone, a web appliance, a network router, switch or bridge, or any machine capable of executing instructions (sequential or otherwise)

that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, alphanumeric input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 that is non-transitory on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 1502.11 family of standards known as Wi-Fi®, IEEE 802.16 family of standards known as WiMax®), IEEE 1502.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SLMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

ADDITIONAL NOTES & EXAMPLES

The following non-limiting examples are provided to further illustrates different embodiment of the disclosed principles. Example 1 is directed to a method to provide self-coordinated display of a digital signage, the method comprising: identifying a display location to display the digital signage; determining if a projection surface is available at the display location, if the projection surface is unavailable at the display location directing a first screen-forming drone to provide the projection surface at the first location; directing a first projection drone to project a first portion of the digital signage on the projection surface at the display location.

Example 2 is directed to the method of Example 1, further comprising directing a second projection drone to project a second portion of the digital signage on the projection surface.

Example 3 is directed to the method of any of examples 1-2, further comprising self-aligning the first projection drone and the second projection drone to position the first portion and the second portion of the digital signage to form a substantially uniform display of the digital signage.

Example 4 is directed to the method of any preceding example, further comprising non-uniformly distancing or tilting the first and the second projection drones with respect to the projection surface to provide a substantially uniform display of the digital signage.

Example 5 is directed to the method of method of any preceding example, wherein self-aligning the first and the second projection drones further comprises tilting, moving or positioning each of the first and the second drones to provide a substantially uniform display.

Example 6 is directed to the of method of any preceding example, further comprising directing a second screen-forming drone to provide additional projection surface at the display location.

Example 7 is directed to the method of any preceding example, further comprising directing the first screen-forming drone and the first projection drone to one of a subsequent display location to provide a clear line of sight (LOS) to an audience.

Example 8 is directed to the method of any preceding example, further comprising enlarging the digital signage by one of moving the first projection drone away from the projection surface or by amplifying a projected video signal from the first projection drone.

Example 9 is directed to the method of any preceding example, further comprising gauging an audience response to the digital signage and determining whether to continue displaying the digital signage.

Example 10 is directed to a non-transient machine-readable medium including instructions to provide self-coordinated display of a digital signage, which when executed on one or more processors, causes the one or more processors to: identify a display location to display the digital signage; determine if a projection surface is available at the display location, if the projection surface is unavailable at the display location, direct a first screen-forming drone to provide a projection surface at the first location; direct a first projection drone to project a first portion of the digital signage on the projection surface at the display location.

Example 11 is directed to the medium of Example 10, wherein the instructions further cause the one or more processors to direct a second projection drone to project a second portion of the digital signage on the projection surface.

Example 12 is directed to the medium of examples 10-11, wherein the instructions further cause the one or more processors to align the first projection drone and the second projection drone to position the first portion and the second portion of the digital signage to form a substantially uniform display of the digital signage.

Example 13 is directed to the medium of examples 10-12, wherein the instructions further cause the one or more processors to non-uniformly distance or tilt the first or the second projection drones with respect to the projection surface to provide a substantially uniform display of the digital signage.

Example 14 is directed to the medium of examples 10-13, wherein the instructions further cause the first and the second projection drones to one or more of tilt, move or reposition to provide a substantially uniform display.

Example 15 is directed to the medium of examples 10-14, further comprising directing a second screen-forming drone to provide additional projection surface at the first location.

Example 16 is directed to the medium of examples 10-15, further comprising directing the first screen-forming drone and the first projection drone to one of a subsequent display location to provide a clear line of sight (LOS) to an audience.

Example 17 is directed to the medium of examples 10-16, wherein the instructions further cause the one or more processors to direct the first and the second drones to enlarge the digital signage by one of moving away from the projection surface or by amplifying a projected video signal.

Example 18 is directed to the medium of examples 10-17, wherein the instructions further cause the one or more processors to receive an audience response to the digital signage and to determine whether to continue displaying the digital signage.

Example 19 is directed to a drone system to dynamically display a digital signage at a first location to an audience, the system comprising: a first projection drone to identify a display surface at the first location, the first projection drone configured to project a first portion of the digital signage onto the display surface; a second projection drone in communication with the first projection drone, the second projection drone configured to project a second portion of the digital signage onto the display surface; wherein the first projection drone and the second projection drones are configured to self-align to project a substantially uniform image of the digital signage at the first location.

Example 20 is directed to the system of example 19, wherein the first projection drone and the second projection drone self-align by at least one of aligning, tilting or setting a distance with respect to the display surface.

Example 21 is directed to the system of examples 19-20, wherein the first projection drone self-aligns by at least one of aligning, tilting or setting a distance with respect to the second projection drone.

Example 22 is directed to the system of examples 19-21, further comprising first screen-forming drone to provide at least a portion of the display surface.

Example 23 is directed to the system of examples 19-22, wherein the first screen-forming drone traverses to the first location to receive at least one of the projected first or second portions of the digital signage.

Example 24 is directed to the system of examples 19-23, further comprising a second screen-forming drone configured to align with the first screen-forming drone to receive at least one of the projected first or second portions of the digital signage.

Example 25 is directed to the system of examples 19-24, wherein at least one of the first projection drone, the second projection drone or the first surface drone is configured to relocate to provide a line of sight (LOS) to the audience.

Example 26 is directed to the system of examples 19-25, wherein the first projection drone, the second projection drone and the first surface drone are configured to move from the first location to a second location to continue providing a LOS to the audience.

Example 27 is directed to the system of examples 19-26, wherein the first drone is configured to enlarge the first portion of the digital display by at least one of moving with respect to the display surface or by amplifying a projected video signal.

Example 28 is directed to a non-transient, machine readable-storage including machine-readable instructions, when executed, to implement a method or realize an apparatus as exampled in examples 1-10.

Example 29 is directed to a non-transient, machine readable-storage including machine-readable instructions, when executed, to implement a method or realize an apparatus as exampled in examples 19-27.

Example 30 is directed to the a system to provide self-coordinated display of a digital signage, the system comprising: means for identifying a display location to display the digital signage; means for determining if a projection surface is available at the display location, if the projection surface is unavailable at the display location, means for directing a first screen-forming drone to provide the projection surface at the first location; means for directing a first projection drone to project a first portion of the digital signage on the projection surface at the display location.

Example 31 is directed to the system of example 30, further comprising means for directing a second projection drone to project a second portion of the digital signage on the projection surface.

Example 32 is directed to the system of examples 30-31, further comprising means for self-aligning the first projection drone and the second projection drone to position the first portion and the second portion of the digital signage to form a substantially uniform display of the digital signage.

Example 33 is directed to the system of examples 30-32, further comprising means for non-uniformly distancing or tilting the first and the second projection drones with respect to the projection surface to provide a substantially uniform display of the digital signage.

Example 34 is directed to the system of examples 30-33, wherein means for self-aligning the first and the second projection drones further comprises means for tilting, moving or positioning each of the first and the second drones to provide a substantially uniform display.

Example 35 is directed to the system of examples 30-34, further comprising means for directing a second screen-forming drone to provide additional projection surface at the display location.

Example 36 is directed to the system of examples 30-35, further comprising means for directing the first screen-forming drone and the first projection drone to one of a subsequent display location to provide a clear line of sight (LOS) to an audience.

Example 37 is directed to the system of examples 30-36, further comprising means for enlarging the digital signage by one of moving the first projection drone away from the projection surface or by amplifying a projected video signal from the first projection drone.

Example 38 is directed to the system of examples 30-37, further comprising means for gauging an audience response.

While the principles of the disclosure have been illustrated in relation to the exemplary embodiments shown herein, the principles of the disclosure are not limited thereto and include any modification, variation or permutation thereof.

What is claimed is:

1. A method to provide self-coordinated display of a digital signage, the method comprising:
   identifying a display location to display the digital signage;
   determining if a projection surface is available at the display location, if the projection surface is unavailable at the display location directing a first screen-forming drone to provide the projection surface at a first location by supporting a portion of a dropdown screen;
   positioning the first projection drone with respect to the projection screen for audience viewing; and
   directing a first projection drone to project a first portion of the digital signage on the dropdown surface at the display location.

2. The method of claim 1, further comprising directing a second projection drone to project a second portion of the digital signage on the dropdown surface.

3. The method of claim 2, further comprising self-aligning the first projection drone and the second projection drone to position the first portion and the second portion of the digital signage to form a substantially uniform display of the digital signage.

4. The method of claim 2, further comprising non-uniformly distancing or tilting the first and the second projection drones with respect to the projection surface to provide a substantially uniform display of the digital signage.

5. The method of claim 3, wherein self-aligning the first and the second projection drones further comprises tilting, moving or positioning each of the first and the second drones to provide the substantially uniform display of the digital signage.

6. The method of claim 1, further comprising directing a second screen-forming drone to provide additional dropdown surface at the display location.

7. The method of claim 1, further comprising directing the first screen-forming drone and the first projection drone to one of a subsequent display location to provide a clear line of sight (LOS) to an audience.

8. The method of claim 1, further comprising enlarging the digital signage by one of moving the first projection drone away from the dropdown surface or by amplifying a projected video signal from the first projection drone.

9. The method of claim 1, further comprising gauging an audience response to the digital signage and determining whether to continue displaying the digital signage.

10. A non-transient machine-readable medium including instructions to provide self-coordinated display of a digital signage, which when executed on one or more processors, causes the one or more processors to:
    identify a display location to display the digital signage;
    determine if a projection surface is available at the display location, if the projection surface is unavailable at the display location, direct a first screen-forming drone to provide a projection surface at a first location by supporting a portion of a dropdown screen;
    position the first projection drone with respect to the dropdown screen for audience viewing; and
    direct a first projection drone to project a first portion of the digital signage on the projection dropdown surface at the display location.

11. The medium of claim 10, wherein the instructions further cause the one or more processors to direct a second projection drone to project a second portion of the digital signage on the dropdown surface.

12. The medium of claim 11, wherein the instructions further cause the one or more processors to align the first projection drone and the second projection drone to position the first portion and the second portion of the digital signage to form a substantially uniform display of the digital signage.

13. The medium of claim 11, wherein the instructions further cause the one or more processors to non-uniformly distance or tilt the first or the second projection drones with respect to the dropdown surface to provide a substantially uniform display of the digital signage.

14. The medium of claim 12, wherein the instructions further cause the first and the second projection drones to one or more of tilt, move or reposition to provide the substantially uniform display of the digital signage.

15. The medium of claim 10, further comprising directing a second screen-forming drone to provide additional dropdown surface at the first location.

16. The medium of claim 10, further comprising directing the first screen-forming drone and the first projection drone to one of a subsequent display location to provide a clear line of sight (LOS) to an audience.

17. The medium of claim 12, wherein the instructions further cause the one or more processors to direct the first and the second projection drones to enlarge the digital signage by one of moving away from the dropdown surface or by amplifying a projected video signal.

18. The medium of claim 10, wherein the instructions further cause the one or more processors to receive an audience response to the digital signage and to determine whether to continue displaying the digital signage.

* * * * *